United States Patent
Li et al.

(10) Patent No.: US 8,538,279 B2
(45) Date of Patent: Sep. 17, 2013

(54) METHOD AND APPARATUS FOR CARRIER PHASE ESTIMATION AND CORRECTION IN A COHERENT OPTICAL SYSTEM

(75) Inventors: Chuandong Li, Ottawa (CA); Zhuhong Zhang, Ottawa (CA); Fei Zhu, San Jose, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 254 days.

(21) Appl. No.: 13/179,300

(22) Filed: Jul. 8, 2011

(65) Prior Publication Data

US 2012/0008952 A1 Jan. 12, 2012

Related U.S. Application Data

(60) Provisional application No. 61/362,788, filed on Jul. 9, 2010.

(51) Int. Cl.
*H04B 10/00* (2013.01)
*H04B 10/06* (2011.01)
*H04B 10/66* (2013.01)

(52) U.S. Cl.
CPC .................................. *H04B 10/66* (2013.01)
USPC ............................. 398/208; 398/152; 398/155

(58) Field of Classification Search
USPC .......................................... 398/152, 155, 208
See application file for complete search history.

(56) References Cited

U.S. PATENT DOCUMENTS

| | | | |
|---|---|---|---|
| 7,602,322 B2 * | 10/2009 | Tanimura et al. | 341/118 |
| 7,606,498 B1 | 10/2009 | Wu et al. | |
| 8,401,402 B2 * | 3/2013 | Cai et al. | 398/208 |
| 2004/0091066 A1 | 5/2004 | Noe | |
| 2009/0324224 A1 * | 12/2009 | Xie | 398/65 |
| 2011/0150478 A1 * | 6/2011 | Winzer | 398/65 |

OTHER PUBLICATIONS

Kazovsky, L., "Phase and Polarization Diversity Coherent Optical Techniques," Journal of Lightwave Technology, vol. 7, No. 2, Feb. 1989, pp. 279-292.
Noe, R., et al., "Phase Noise-Tolerant Synchronous QPSK/BPSK Baseband-Type Intradyne Receiver Concept With Feedforward Carrier Recovery," Journal of Lightwave Technology, vol. 23, No. 2, Feb. 2005, pp. 802-808.

* cited by examiner

*Primary Examiner* — Dalzid Singh
(74) *Attorney, Agent, or Firm* — Conley Rose, P.C.; Grant Rodolph; Clint Wilkins

(57) ABSTRACT

An apparatus comprising a nonlinear lookup unit (NL-LUU) configured to add a phase shift to a signal sample to compensate for pattern dependent phase distortion, and one or more first phase adjustment units coupled to NL-LUU and configured to remove from the signal sample a nonlinear phase error from the NL-LUU, wherein the signal sample corresponds to a received signal polarization component of a polarization multiplexed (PM) coherent signal in a PM coherent optical system.

31 Claims, 13 Drawing Sheets

METHOD AND APPARATUS FOR CARRIER PHASE ESTIMATION AND CORRECTION IN A COHERENT OPTICAL SYSTEM

CROSS-REFERENCE TO RELATED APPLICATIONS

The present application claims priority to U.S. Provisional Patent Application No. 61/362,788 filed Jul. 9, 2010 by Chuandong Li et al. and entitled, "Method and Apparatus for Carrier Phase Estimation and Correction in Coherent Optical System," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In optical communications, many modulation schemes have been used to transport data. On-Off keying (OOK) is one modulation scheme that has been used, where data is encoded using signal intensity variation. OOK introduces strong characteristic tones in the signal frequency domain, which can be detected as periodic intensity variations in the signal. To detect the signals, a conventional clock recovery scheme is used to obtain the timing information in the tones, such as by filtering the detected signal intensities using a narrow band pass filter. Phase Shift Keying (PSK), Differential PSK (DPSK), Quadrature PSK (QPSK), and Differential QPSK (DQPSK) are other modulation schemes that have been used more recently. In such modulation schemes, the data is encoded using signal phase variation. Quadrature phase based modulation has been widely used for many years to achieve high spectrum efficiency in radio frequency (RF) communications systems, including polarization multiplexed optical communications systems. In polarization multiplexed optical communications systems, two signals are carried on one wavelength at two orthogonal linear polarization states, where one signal is modulated in one of the orthogonal polarization states and the other signal is modulated in the other orthogonal polarization state. The quadrature phase modulation in polarization multiplexed optical communications systems can achieve about a four fold improvement in transmission efficiency, e.g. in comparison to other modulation schemes.

SUMMARY

In one embodiment, the disclosure includes an apparatus comprising a nonlinear lookup unit (NL-LUU) configured to add a phase shift to the signal sample to compensate for pattern dependent phase distortion, and one or more first phase adjustment units coupled to the NL-LUU and configured to remove from the signal sample a nonlinear phase error from the NL-LUU, wherein the signal sample corresponds to a received signal polarization component of a polarization multiplexed (PM) coherent signal in a PM coherent optical system.

In another embodiment, the disclosure includes a network component comprising a receiver configured to receive a plurality of samples of signal polarization component of a PM coherent signal that is transported over an optical channel, remove noise in the samples using a linear filter, and remove nonlinear phase noise in the samples using a NL-LUU based feed forward phase correction (FFCR) and a decision circuit.

In yet another embodiment, the disclosure includes a network apparatus implemented method comprising receiving a sample of a signal polarization component in a transmitted PM coherent signal, and implementing a FFCR using a linear filter and a NL-LUU based on a decision circuit to remove noise and carrier phase noise in the sample.

In yet another embodiment, the disclosure includes a system for carrier phase estimation and correction in a coherent optical environment comprising a transmitter comprising a frame and header coding unit and a signal combination block coupled to the frame and header coding unit, wherein the frame and header coding unit is configured to encode and/or encapsulate input data into a plurality of parallel data streams, corresponding to a plurality of branches of a polarization multiplexed (PM) Quadrature amplitude modulation (QAM) signal, and wherein an output of the frame and header coding unit may be converted into an optical signal in the multiplexer in which the plurality of parallel data streams are combined with an electrical/optical (E/O) converter and transferred into a PM coherent signal; and a receiver comprising configured to receive the PM coherent signal from the transmitter, wherein the receiver comprises a filter configured to remove noise from a signal sample; a nonlinear lookup unit (NL-LUU) configured to add a phase shift to the signal sample to compensate for pattern dependent phase distortion; and one or more first phase adjustment units coupled to the filter and the NL-LUU and configured to remove from the signal sample a recovered linear carrier phase error from the filter and a nonlinear phase error from the NL-LUU, wherein the signal sample corresponds to a received signal polarization component of a polarization multiplexed (PM) coherent signal in a PM coherent optical system.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A phase and polarization diversity coherent communications system has been previously introduced, e.g. by L. G. Kazovsky in "Phase- and Polarization-Diversity Coherent Optical Techniques", J. of Lightwave Technology, Vol. 7, No. 2, 1989, which is incorporated herein by reference as if reproduced in its entirety. However, two aspects of the system, which include signal impairments caused by optical fiber channel and hardware feasibility of digital signal processing (DSP) algorithm, have prevented the deployment of the system in communications networks. The signal impairments may comprise carrier phase uncertainty due to non-zero phase noise generated by lasers, nonlinear phase modulation generated during signal propagation inside fiber, frequency mismatch between carrier and local oscillator (LO), or combinations thereof. For instance, when phase error reaches about $\pi/4$ for QPSK and about $\pi/2$ for binary PSK (BPSK), a cycle slip may occur and result in errors for every symbol following the cycle slip. Thus, a method that is hardware feasible may be needed to track carrier phase.

Figure 1:
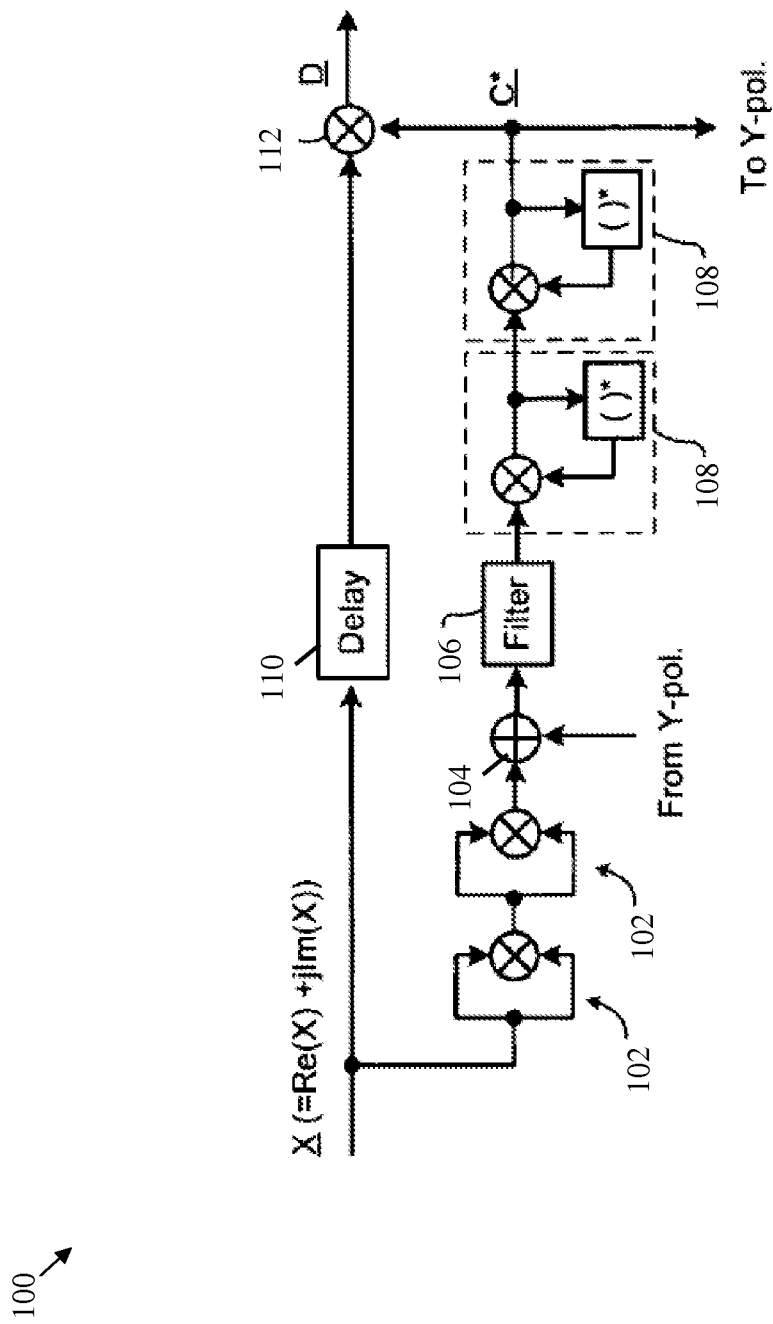
FIG. 1 is a schematic diagram of an embodiment of a carrier phase recovery receiver.

FIG. 1 shows a carrier phase recovery receiver 100 that was proposed by R. Noe in "Phase Noise-Tolerant Synchronous QPSK/BPSK Baseband-Type Intradyne Receiver Concept with Feedforward Carrier Recovery", Journal of Lightwave Technology, Vol. 23, No. 2, 2005, which is incorporated herein by reference. The phase recover receiver 100 may comprise about two cascaded phase doublers 102, a coupler 104, a filter 106, about two cascaded phase dividers 108, a delay circuit 110, and a mixer 112. The components of the carrier phase recovery receiver 100 may be arranged as shown in FIG. 1. The cascaded phase doublers 102 may achieve a fourth power calculation for an X polarization component of a PM-QPSK signal, where the data phases of the symbols may be removed. The coupler 104 may then couple the output of the cascaded frequency doublers 102 with a Y polarization component of the signal. The filter 106 may then remove a broadband noise from the output signal of the coupler 104. The cascaded phase dividers 108 may then divide the phase of the output of the filter 106 by about four to obtain a complex recovered signal C*. The signal C* may then be mixed by the mixer 112 with the X polarization component of the signal, which may be delayed appropriately by the delay circuit 110, to generate a complex baseband signal D with phase recovery.

The carrier phase recovery receiver 100 may have two limitations in terms of digital implementation. The first limitation corresponds to the complexity of hardware implementation that involves fourth power calculation and relatively high heat dissipation of a non-causal filter using memory. The second limitation corresponds to the lack of a solution for the inherently about 90 degrees phase ambiguity that leads to about $\pi/4$ phase errors, such as cycle slip. Thus, carrier phase recovery receiver 100 may only be suitable for differential coded QPSK applications.

Figure 2:
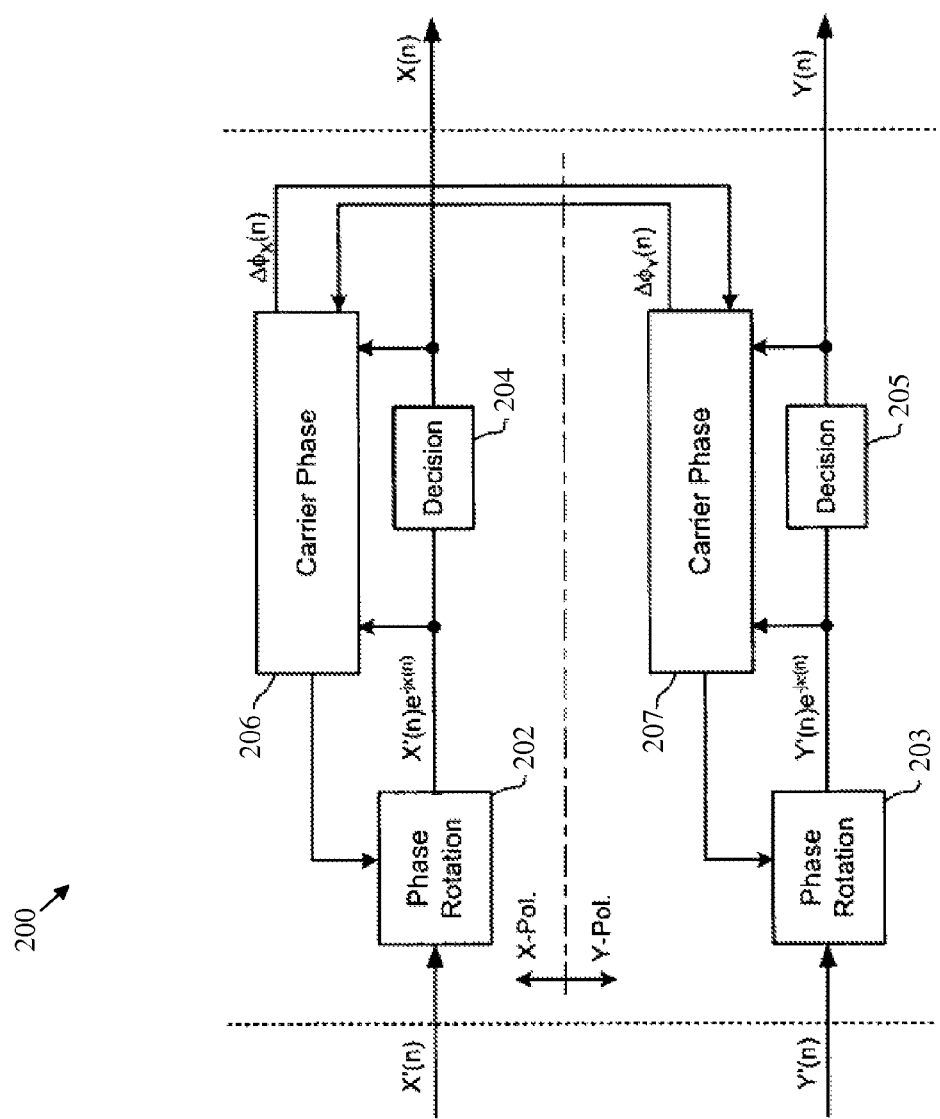
FIG. 2 is a schematic diagram of another embodiment of a carrier phase recovery receiver.

FIG. 2 shows another carrier phase recovery receiver 200 that was proposed in U.S. Pat. No. 7,606,498 by K. Wu and entitled, "Carrier Recovery in a Coherent Optical Receiver," which is incorporated herein by reference. The phase recovery receiver 200 may comprise a first phase rotation circuit 202, a first decision circuit 204, and a first carrier phase circuit 206, which may all operate on an X polarization component of a QPSK signal. The phase recovery receiver 200 may also comprise a second phase rotation circuit 203, a second decision circuit 205, and a second carrier phase circuit 207, which may all operate on a Y polarization component of the QPSK signal. The components of the carrier phase recovery receiver 200 may be arranged as shown in FIG. 2. The carrier phase error may be determined by the difference between the input and output of the first decision circuit 204 (for the X component) and similarly of the second decision circuit 205 (for the Y component). A connection between the first carrier phase circuit 206 and the second carrier phase circuit 207 may be used to further reduce noise impact by joint phase estimation between the first decision circuit 204 and the second decision circuit 205. Wu partitioned transmitted data into continuous data blocks and inserted known symbols in the beginning of each data block. The transmitted data may be received by the carrier phase recovery receiver 200, where the known symbols are used to estimate the carrier phase at the beginning of each data block to avoid decision error. This method may be capable of decoding QPSK but inherently relies on the known symbols to avoid an about $\pi/4$ phase error, which may result in block errors where all the symbols are interpreted as lying in an adjacent quadrant. As such, this method requires that the length of known symbols to be long enough to minimize the error probability. This may reduce the bandwidth of the signal and thus may require using more expensive higher bandwidth lasers. Further, this method may not provide solution once the phase error occurs.

Both of the carrier phase recovery schemes above also may not be capable of compensating for nonlinear phase errors. Disclosed herein is a system and method for correcting carrier phase of received digital samples in a coherent optical system. Carrier phase information may be obtained from the input and output of a decision circuit. Carrier phase correction may be achieved using a feed backward phase ramp correction (FBPC) and a FFCR. The FFCR may comprise using a linear filter and a nonlinear lookup table based phase correction for pattern dependent carrier phase compensation. The system and method may overcome some of the limitations of the carrier phase recovery receiver 100 and the carrier phase recovery receiver 200. For instance, the system and method may not require a fourth order power calculation and using high bandwidth lasers and may compensate for phase distortion due to optical nonlinear propagation.

Figure 3:
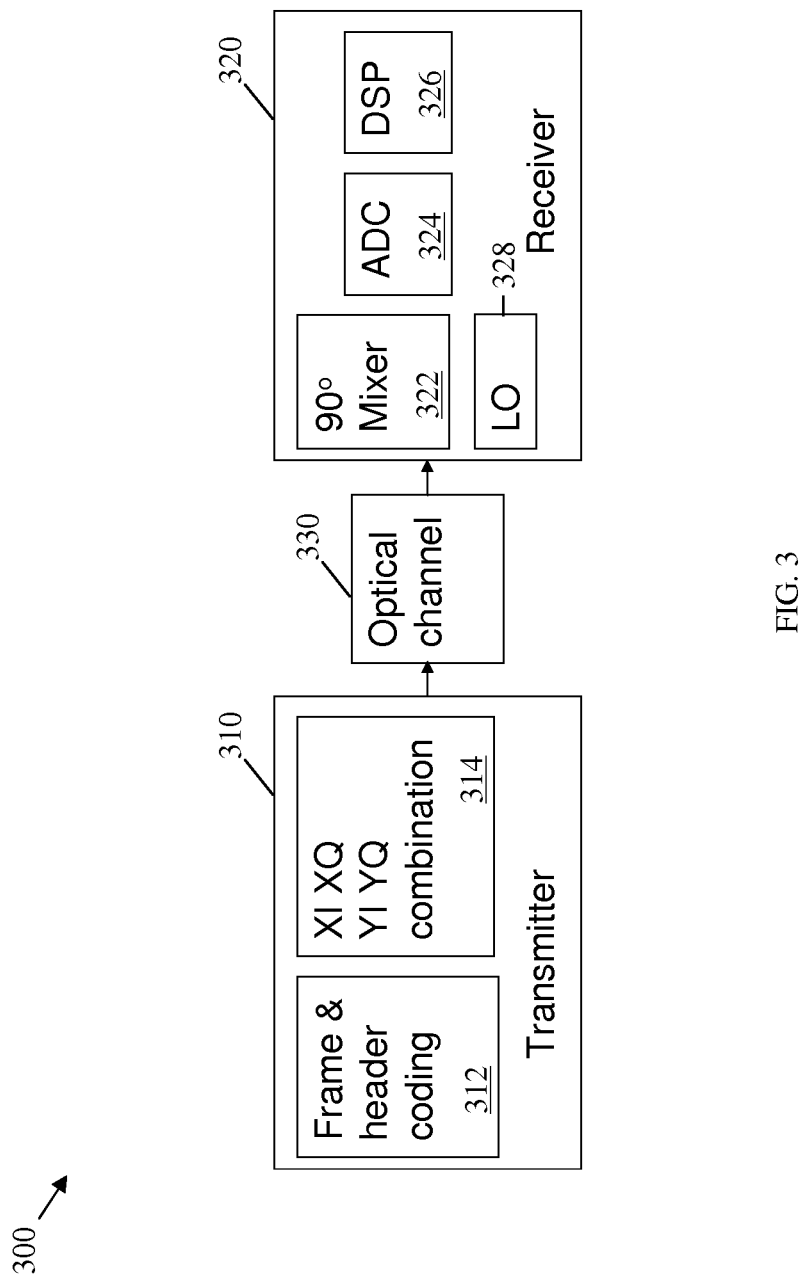
FIG. 3 is a schematic diagram of an embodiment of a polarization multiplexed coherent optical communications system.

FIG. 3 illustrates one embodiment of a PM coherent optical communications system 300, which may implement carrier phase recovery. The PM coherent optical communications system 300 may comprise a transmitter 310 and a receiver 320 that may be coupled to the transmitter 310 via an optical channel 330, which may be arranged as shown in FIG. 3. The PM coherent optical communications system 300 may use a PSK modulation scheme, such as PM-QPSK.

The transmitter 310 may comprise a frame and header coding unit 312 and a signal combination block or multiplexer 314 coupled to the frame and header coding unit 312. The frame and header coding unit 312 may be configured to encode and/or encapsulate input data into four parallel data streams, corresponding to four branches of a PM Quadrature amplitude modulation (QAM) signal (e.g., PM-QPSK signal). The output of the frame and header coding unit 312 may be converted into optical signal in the multiplexer 314, in which four data streams are combined accordingly with and electrical/optical (E/O) converter and transferred into the optical signal.

The optical signal from the multiplexer 314 may be received by the receiver 320 after propagating through the optical channel 330. As such, the rate of the signal components (e.g. symbol rate) may be equal to about a quarter of the rate of the original data at the input of the frame and header coding unit 312. The signal components of the PM optical signal may be transmitted using a non return to zero (NRZ) or return to zero (RZ) modulation format and may have about the same carrier frequency, e.g. the same optical wavelength. The carrier frequency may be an optical wavelength provided by a laser (not shown) and may comprise phase noise. The signal components may comprise about two orthogonal phase components, e.g. an in-phase (I) component and a quadratic-phase (Q) component, for each of two orthogonal polarization components, e.g. an X polarization component and a Y polarization component. As such, the transmitter 310 may transmit about four components, e.g. XI, XQ, YI, and YQ, which may be combined and transmitted via the optical channel 330 to the receiver 320. The data blocks in the transmitted PM optical signal may correspond to the different signal components, which may be indicated by polarization information in the blocks, e.g. the blocks' headers.

The optical channel 330 may be configured to transport the PM optical signal from the transmitter 310 to the receiver 320 and as such may comprise a plurality of optical fibers, optical filters, amplifiers, or combinations thereof. Such components of the optical channel 330 may introduce undesired signal changes, such as chromatic dispersion, nonlinear phase noise, polarization mode dispersion (PMD), polarization dependent loss/gain, polarization rotation, optical white Gaussian noise, or combinations thereof.

The receiver 320 may comprise a 90 degrees mixer 322, an analog to digital converter (ADC) 324 coupled to the 90 degrees mixer 322, a DSP unit 326 coupled to the ADC 324, and a laser serving as a local oscillator (LO) 328 coupled to the remaining components. The 90° mixer 322 may comprise an about 90 degrees optical cross network mixer and a photodetector, e.g. a p-type/intrinsic/n-type (PIN) diode and may be configured to mix the received orthogonal components of the optical signal from the transmitter 310 and split the signal into a plurality of signals, where each signal may be a combination of the orthogonal signal components. The 90° mixer 322 may mix the received optical signal components with an optical signal from the LO 328 that may have a close or about the same carrier frequency of the transmitted optical signal. The output mixed signals from the 90° mixer 322 may then be converted by the ADC 324 (e.g. from analog to digital) and forwarded to the DSP unit 326, which may be configured to process the signals and recover the data in the transmitted signal. The DSP unit 326 may process the signals and recover the transmitted data in the signals. The DSP unit 326 may also be configured for carrier phase recovery and correction, as described in detail below. The DSP unit 326 may also separate the data blocks that correspond to the different signal components, e.g. by detecting the polarization information in the blocks, e.g. the blocks' headers.

Figure 4:
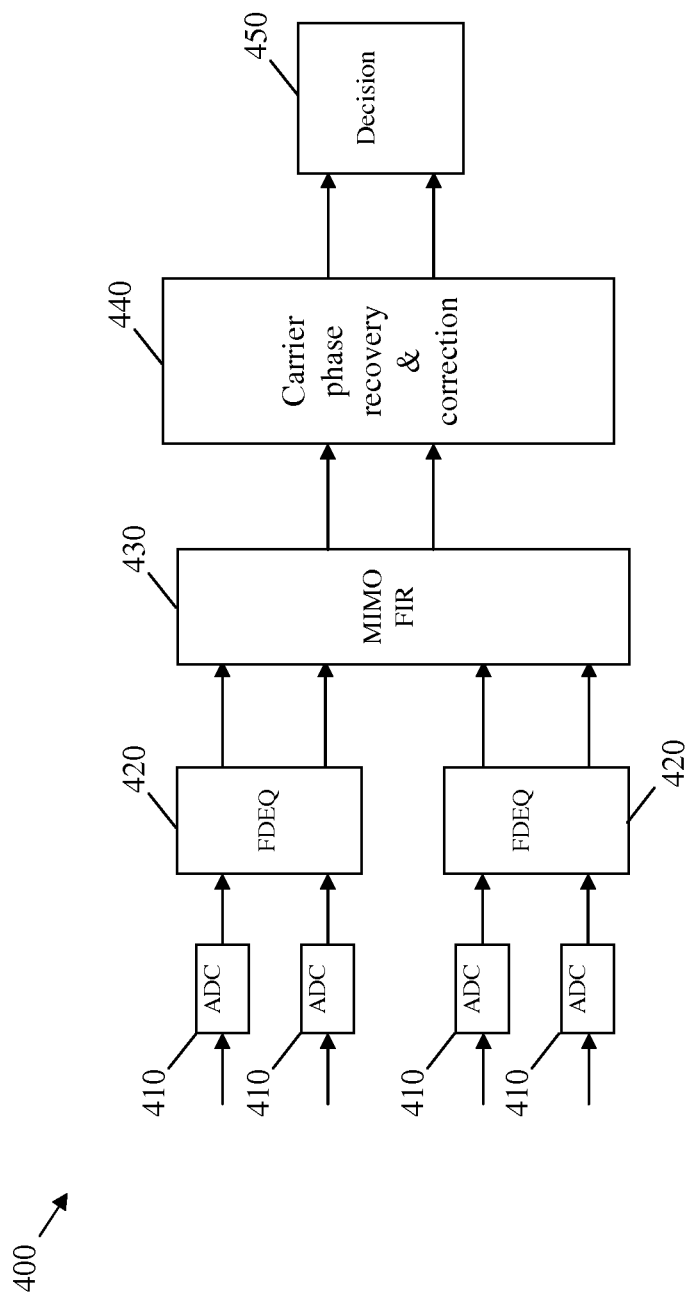
FIG. 4 is a schematic diagram of another embodiment of a receiver digital signal processing unit.

FIG. 4 illustrates an embodiment of a receiver DSP unit 400 that may be configured for carrier phase recovery and correction. For instance, the receiver DSP unit 400 may correspond to the DSP unit 326 in the PM coherent optical communications system 300. The receiver DSP unit 400 may comprise a plurality of ADCs 410, about two frequency domain equalizers (FDEQs) 420, a multiple-input and multiple-output (MIMO) and finite impulse response (FIR) block 430, a carrier phase recovery and correction module 440, and a decision circuit 450. The components of the receiver DSP unit 400 may be arranged as shown in FIG. 4.

The receiver DSP unit 400 may receive a quadrature (Q) component and an in-phase (I) component for each of the two polarization components (X and Y), where each component may each be received via a corresponding ADC 410. For example, each of the ADCs 410 may receive one of a XI, XQ, YI, and YQ signal component. The ADCs 410 may convert the received signals from analog to digital signals. The FDEQs 420 may be any devices that are configured to receive the signal components from the ADCs 410 and perform signal conditioning, e.g. to compensate for chromatic dispersion or other signal distortions in the signal components. The FDEQs 420 may then send the signal components to the MIMO and FIR block 430.

The MIMO and FIR block 430 may comprise a MIMO equalizer that receives the data blocks in the signal components and processes the data blocks to improve carrier frequency and/or phase estimation, e.g., by implementing a sequence loop. The initial phase may be estimated based on known symbols in the signals, for instance by subtracting a known symbol phase of a signal from the received sample's phase. As such, the symbols may be placed or aligned correctly and phase ambiguity may be substantially eliminated. The MIMO and FIR block 430 may also comprise a plurality of FIRs that may be configured to separate the data blocks of the different polarized signals received from the FDEQs 420. At the output of the MIMO and FIR block 430, the digital samples in the signals may be compensated for distortions caused by the optical channel, but without necessarily removing carrier phase divergences or misalignments in the signal samples. At the output of the MIMO and FIR block 430, the phase for each sample may comprise a PSK data phase, the laser phase noise, LO frequency offset, Gaussian noise, and/or nonlinear noise. To recover the carrier phase of the originally transmitted signal, carrier phase may be corrected in the carrier phase recovery and correction module 440.

The carrier phase recovery and correction module 440 may be configured to correct the carrier frequency and/or phase in the received data streams from the MIMO and FIR block 430 based on the carrier frequency and/or phase estimation from the MIMO and FIR block 430. The carrier phase recovery and correction circuit 440 may implement a FBPC and a FFCR, which may use a linear filter and a NL-LUT based phase correction for pattern dependent carrier compensation. The output of the carrier phase recovery and correction module 440 may be sent to the decision circuit 450 in which the transmitted data information may be recovered.

Figure 5:
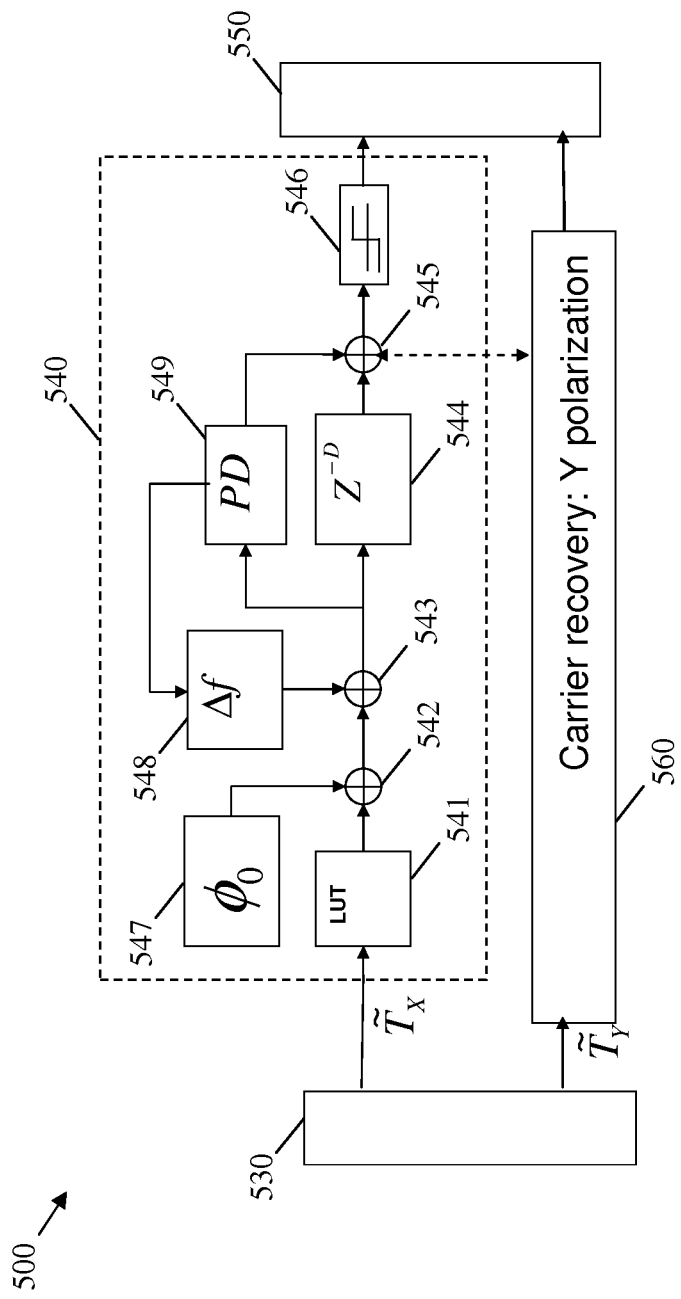
FIG. 5 is a schematic diagram of an embodiment of a carrier phase recovery and correction circuit.

FIG. 5 illustrates an embodiment of a carrier phase recovery and correction circuit 500 that may implement a FBPC and a FFCR using a linear filter and a NL-LUT. For instance, the carrier phase recovery and correction circuit 500 may correspond to the carrier phase recovery and correction module 440. The carrier phase recovery and correction circuit 500 may comprise a first carrier phase recovery block 540 for an X signal component and a second carrier phase recovery block 560 for a Y signal component, which may be positioned between a MIMO and FIR block 530 and a decision circuit 550. The MIMO and FIR block 530 and the decision circuit 550 may be configured substantially similar to the MIMO and FIR block 430 and the decision circuit 450, respectively.

The first carrier phase recovery block 540 may process the X polarization component of the signals and may comprise a lookup table (LUT) 541, a first phase adjustment unit 542, a second phase adjustment unit 543, a delay unit 544, a third phase adjustment unit 545, a bit detector 546, a common phase estimator 547, a linear phase ramp estimator 548, and a phase detector (PD) 549, which may be arranged as shown in FIG. 5. The first carrier phase recovery block 540 may be coupled to the MIMO and FIR block 530, e.g., via the LUT 541, and to the decision circuit 550, e.g., via the bit detector 546. The second carrier phase recovery block 560 may process the Y polarization component of the signals and may comprise similar components as the first carrier phase recovery block 540.

The LUT 541 may receive the output from the MIMO and FIR block 530, e.g., digital samples $\tilde{T}=I+jQ$ (e.g., for the X component). At the LUT 541, the received data sample vectors may be converted from Cartesian to Polar coordinates and the relationship between input and output may be $\tan^{-1}(Q/I)$. Converting the data sample vectors from Cartesian to Polar coordinates may simplify the hardware implementation of phase rotation or adjustment by using addition instead of multiplication operations. The first phase adjustment unit 542 may then remove a common phase from the digital samples received from the LUT 541. The common phase ($\phi_O$) of the samples may be estimated by the common phase estimator 547 using a set of known bits sequence or a specific coding scheme. The known bits may be user defined unique words or frame header words defined in various standards and/or communication protocols. The specific coding scheme may be used to provide a unique combination of data bit to help calculating the common phase ($\phi_O$).

The second phase adjustment unit 543 may adjust the output of the first phase adjustment unit 542 with a linear phase ramp ($\Delta f$) obtained from the linear phase ramp estimator 548. After phase adjustment, the samples may be forwarded to the delay unit 544 and subsequently to a third phase adjustment unit 545. The third phase adjustment unit 545 may adjust the output samples from the delay unit 544 with a linear phase divergence detected by the PD 549 and a nonlinear pattern dependent phase distortion as describe below. The delay unit 544 may delay the samples by a time delay ($Z^{-D}$) that may be determined according to the time required to detect the linear phase divergence in the PD 549. Specifically, the PD 549 may implement a decision directed FFCR and a NL-LUT, as described in detail below. The bit detector 546 may then detect information bits in the output samples from the third phase adjustment unit 545 after removing noise/distortion in the samples.

Figure 6:
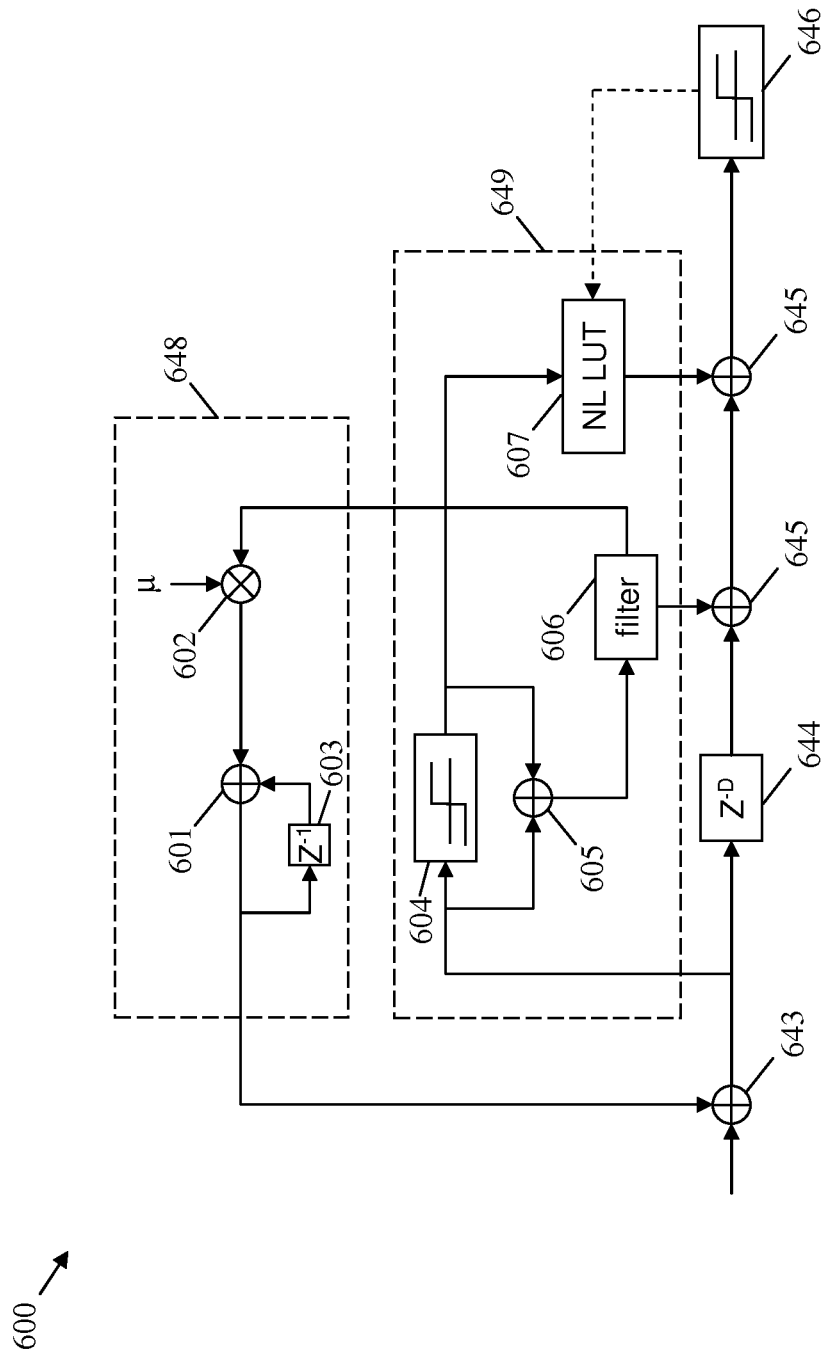
FIG. 6 is a schematic diagram of an embodiment of linear phase ramp correction and phase detection circuits.

FIG. 6 illustrates an embodiment of linear phase ramp correction and phase detection circuits 600 that may implement a FBPC and a NL-LUT based FFCR. The linear phase ramp correction and phase detection circuits 600 may comprise a first phase adjustment unit 643, a delay unit 644, two second phase adjustment units 645, a bit detector 646, a linear phase ramp estimator 648, and a PD 649, which may be arranged as shown in FIG. 600. The first phase adjustment unit 643, the delay unit 644, the two second phase adjustment units 645, the bit detector 646, the linear phase ramp estimator 648, and the PD 649 may be configured substantially similar to the second phase adjustment unit 543, the delay unit 544, the third phase adjustment units 545, the bit detector 546, the linear phase ramp estimator 548, and the PD 549, respectively.

The PD 649 may implement a FFCR and comprise a second bit detector 604, a phase error detection unit 605, a liner filter 606, and a NL-LUT 607. The FFCR may be implemented based on the phase information subtracted from a decision circuit. Specifically, the second bit detector 604 may detect information bits in the output samples from the first phase adjustment unit 643 after removing noise/distortion in the samples. The phase error detection unit 605 may determine the remaining phase error after the first phase adjustment unit 643. The linear filter 606 may be used to remove noise impact of detected phase error from the phase error detection unit 605. The linear filter 606 may be a flat average window with FIR tap coefficients 0 and 1. The bandwidth of the linear filter 606 may be tuned by the number of the taps with coefficients 0. The NU-LUT 607 may be configured to add a phase shift to the samples depending on a pre-detected data pattern. The length of the pattern may depend on self-phase modulation (SPM) characterization. The NL-LUT 607 may be built up based on the recovered data pattern, with or without cross connection between the two polarization components of the signals (X and Y components).

The linear phase ramp estimator 648 may implement a FBPC, which may be mathematically an integrator integrated with an accumulation unit 601, a scalar 602, and a delay unit 603. The FBPC scheme may implement a relatively slow loop to compensate for a phase ramp caused by frequency offset of LO.

The output of the NL-LUT 607 and the linear filter 606 may be forwarded to the second phase adjustment units 645 that removes the recovered nonlinear phase error from the NL-LUT 607 and linear carrier phase error from the linear filter 606, respectively, in the signal samples. The bit detector 646 may then detect the information bits from the second phase adjustment units 645 after removing the recovered phase noise/distortion. The output of the bit detector 646 may be used to update the NL-LUT 607 as described below. Specifically, the linear phase ramp estimator 648 may implement the FBPC and the PD 649 may implement the FFCR for carrier phase correction based on carrier phase information provided by the associated decision circuit. The decision circuit associated with the linear phase ramp estimator 648 and the PD 649 corresponds to the delay unit 644, the second phase adjustment units 645, and the bit detector 646. The linear phase ramp estimator 648 and the PD 649 may obtain the carrier phase information from the input and the output of the decision circuit, e.g., the output of the first phase adjustment unit 643 and the output of the bit detector 646.

Figure 7:
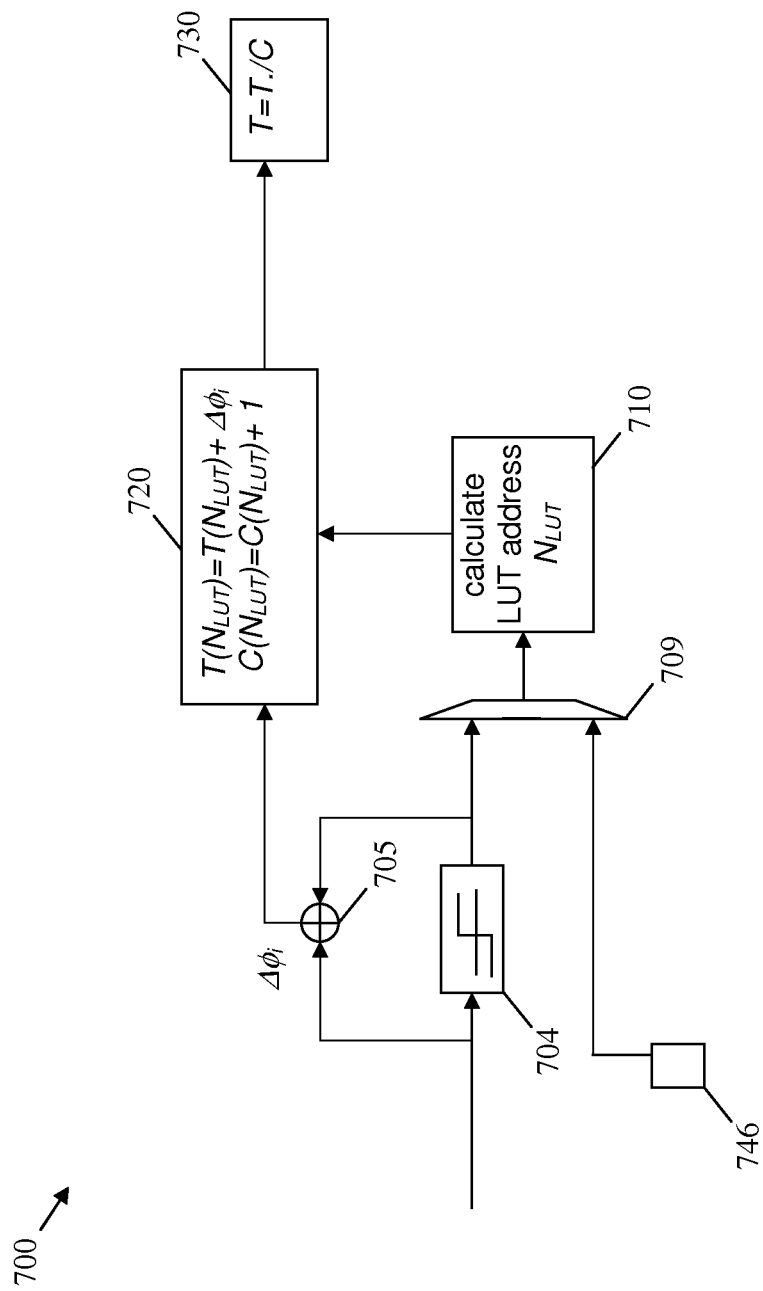
FIG. 7 is a schematic diagram of an embodiment of a nonlinear lookup table building scheme.

FIG. 7 illustrates an embodiment of a NL-LUT building scheme 700 that may be implemented to establish a NL-LUT in a carrier phase recovery correction circuit, such as the NL-LUT 607. The NL-LUT building scheme 700 may use a bit detector 746, a second bit detector 704, and a phase error detection unit 705, which may be configured substantially similar to the bit detector 646, the second bit detector 604, and the phase error detection unit 605. The NL-LUT building scheme 700 may also use a multiplexer 709, a LUT address calculation unit 710, a phase error accumulator 720, and an averaging sample vector unit 730. The components in the NL-LUT building scheme 700 may be arranged as shown in FIG. 7.

The second bit detector 704 may generate a detected signal phase that may be used to calculate the LUT address in unit 710. Additionally, the LUT address calculation unit 710 may also used signal phase from the bit detector 746. The bit detector 746 may be part of a carrier phase recovery correction circuit coupled to the NL-LUT, such as the bit detector 646 in the linear phase ramp correction and phase detection circuits 600. Either the detected signal phase from the bit detector 746 and/or the second bit detector 704 may be forwarded to the LUT address calculation unit 710 via the switching unit 709. The phase error detection unit 705 may determine the remaining phase error in the signal after linear phase correction from linear filter unit 606 in FIG. 6 and accordingly accumulate the phase error of samples forwarded to the phase error accumulator 720. The LUT address may be calculated at the LUT address calculation unit 710 as follows:
1. For each pair of adjacent symbols $S_i$, an index $N_i$ is calculated as $$N_i = \text{round}((|\Delta S_{xi}|^2 + |\Delta S_{yi}|^2)/4),$$

where $\Delta S_{xi} = S_{xi} - S_{xi-1}$ & $S_{xi} = \pm 1 \pm i$;
2. LUT address is calculated as $$N_{LUT} = \sum_{i=0}^{L-1} N_i \cdot 5^i,$$

where L is selected depending on symbols interfering length, which may be impacted by dispersion, hardware bandwidth limitation, etc.

The output of the LUT address calculation unit 710 may be used to accumulate phase error in the phase error accumulator 720 at the corresponding address. The phase error accumulator 720 may also comprise a counter that may be updated to count the number of adjusted samples $C(N_{LUT})$. After accumulating phase error for a defined period, an average of the phase error may then be calculated by the averaging sample vector unit 730. The above procedure for building NT-LUT may be implemented once during system start up. The NL-LUT building scheme 700 may also be implemented repeatedly during steady state operation. As such, the NT-LUT may be used to compensate distortion in a dynamic manner.

Figure 8:
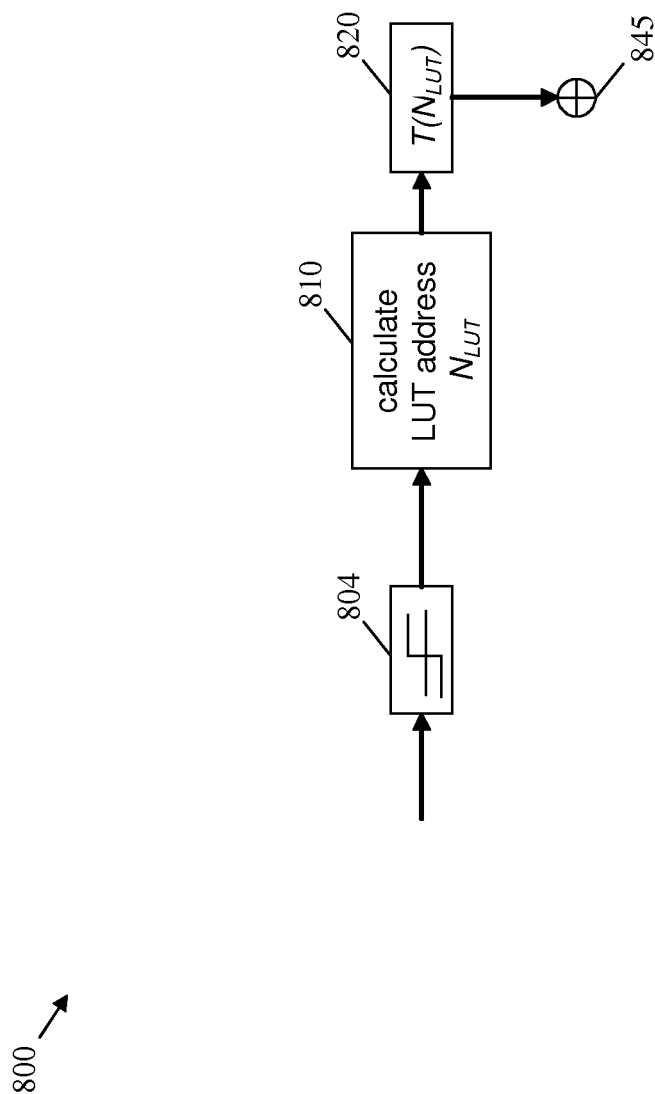
FIG. 8 is a schematic diagram of an embodiment of a nonlinear lookup table circuit.

FIG. 8 illustrates an embodiment of a NL-LUT circuit 800 that may be used in a carrier phase recovery correction circuit, such as the circuits described above. For instance, the NL-LUT circuit 800 may correspond to the NL-LUT 607. The NL-LUT circuit 800 may comprise a bit detector 804, a LUT address calculation unit 810, and a phase error compensator 820, which may be configured substantially similar to the second bit detector 704, the LUT address calculation unit 710, and the phase error accumulator 720. The phase error accumulator 720 may also comprise an averaging sample vector unit, such as the averaging sample vector unit 730. The NL-LUT circuit 800 may also comprise a phase adjustment units 845, such as the phase adjustment units 645. In some embodiments of the carrier phase recovery correction circuits and NL-LUT circuits, the circuit components may be implemented using hardware, software, or a combination of both.

Figure 9:
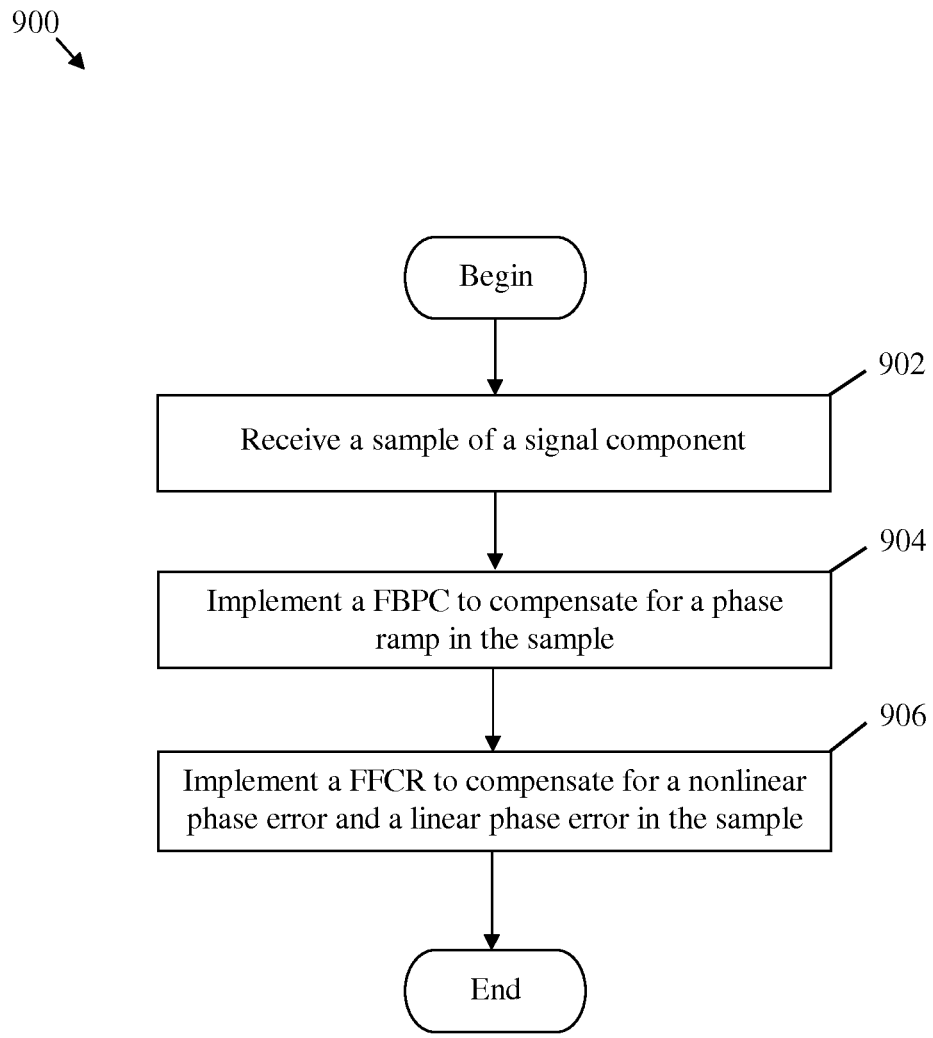
FIG. 9 is a flowchart of an embodiment of a nonlinear lookup table based phase correction method.

FIG. 9 illustrates an embodiment of a NL-LUT based phase correction method 900 that may be implemented by the carrier phase recovery correction circuit, such as any of the circuits described above. The method 900 may begin at block 902, where a sample of a signal component may be received. The signal may be a PSK (e.g., a PM-QPSK) signal and the sample may be for an X or Y signal component and may comprise both I and Q components, such as $\tilde{T} = I + jQ$. At block 904, a FBPC may be implemented to compensate for a phase ramp in the sample, e.g., due to a LO frequency offset. For instance, the FBPC may be implemented using the linear phase ramp estimator 648, as described above. At block 906, a FFCR may be implemented to compensate for a nonlinear phase error and a linear phase error in the sample. For instance, the FFCR may be implemented using the PD 649, as described above. Specifically, the FFCR may be implemented using a linear filter, such as the linear filter 606, and a NL-LUT, such as the NL-LUT 607 or the NL-LUT circuit 800. The method 900 may then end.

Figure 10:
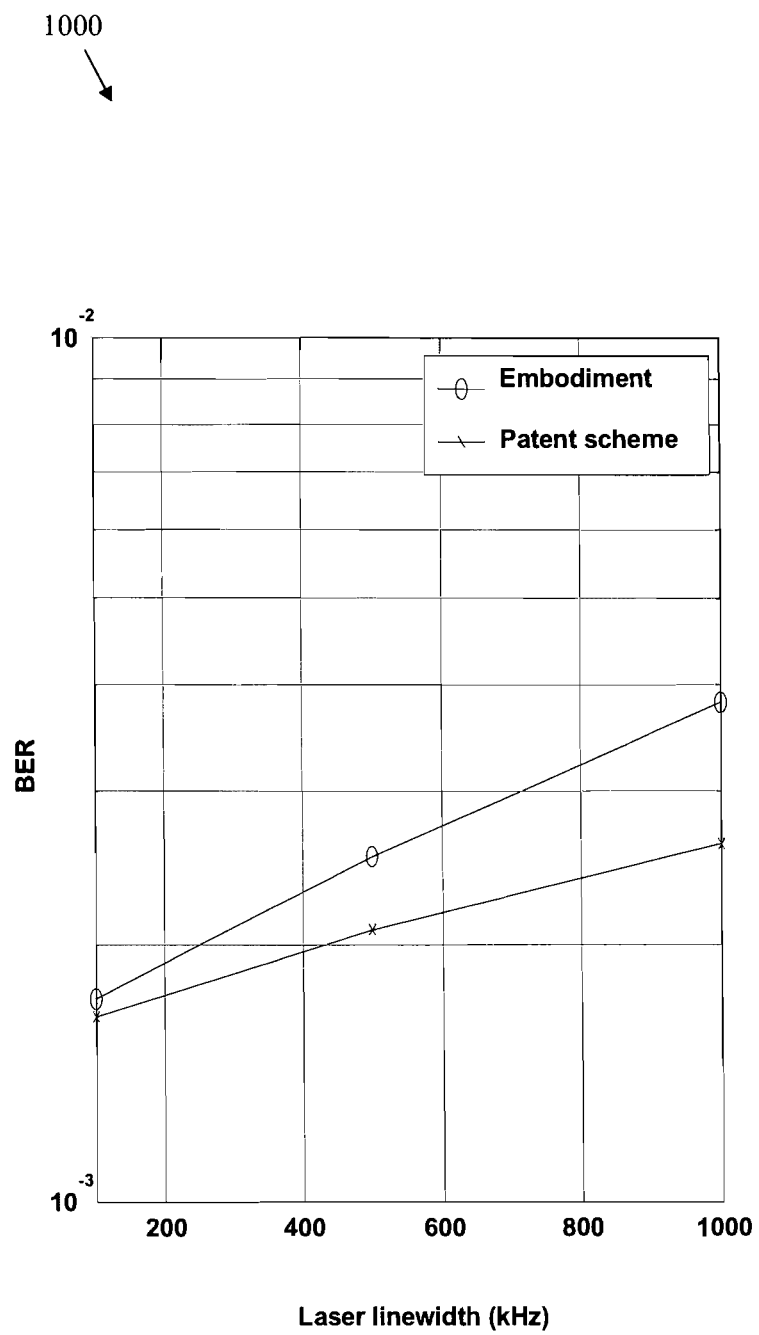
FIG. 10 is a chart of an embodiment of a nonlinear lookup table based phase correction performance.

FIG. 10 shows a chart 1000 that illustrates a NL-LUT based phase correction performance. The chart 1000 shows the performance of an embodiment of the FFCR scheme described above (indicated by a solid line) in comparison to the scheme proposed in the U.S. Pat. No. 7,606,498 (indicated by a dotted solid line). The performances of the two schemes are shown in terms of bit error rate (BER) values (in decibel or dB) versus laser line-width values (in kilohertz or kHz), e.g., the laser bandwidth used for transmission. The two schemes are implemented under the same channel conditions and the same DSP parameter settings for the laser line-width values. The FFCR scheme comprises using a linear filter and a NL-LUT as described above to correct linear and nonlinear phase errors. The FFCR scheme is also implemented with a FBPC scheme, e.g., as described in the NL-LUT based phase correction method 900. The chart 1000 reveals that lower BER values may be achieved for the same laser line-width values using the FFCR scheme, which indicates that the FFCR scheme may tolerate higher phase noise/error. Thus, the FFCR scheme may be used with lower bandwidth laser systems, which may decrease system cost.

Figure 11:
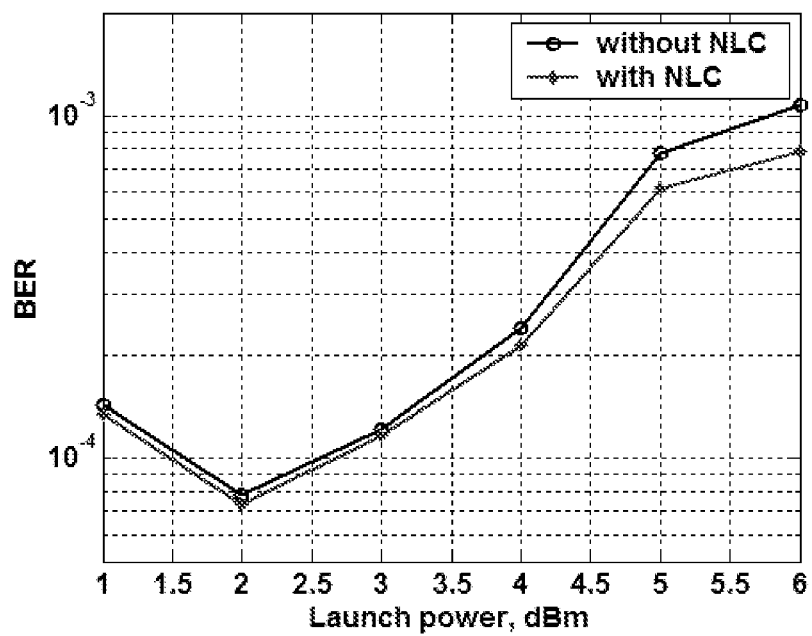
FIG. 11 is a chart of another embodiment of a nonlinear lookup table based phase correction performance.

FIG. 11 shows another chart 1100 that illustrates another NL-LUT based phase correction performance. The chart 1100 shows the performance of the FFCR scheme with nonlinear phase correction (NLC), e.g., using the NL-LUT, in comparison to a similar scheme without NLC, e.g., without using the NL-LUT. The FFCR scheme with NLC is indicated by a solid line curve and the scheme without NLC is indicated by a dotted solid line curve. The performances of the two schemes are shown in terms of BER values (in dB) versus laser launch or transmission power values (in decibel/milliwatt or dBm). The chart 1100 reveals that lower BER values may be achieved for the same launch power values using the FFCR scheme with NLC, which indicates that the NLC scheme (using the NL-LUT) may tolerate higher phase noise/error including nonlinear noise. Further, the improvement using NLC may increase for higher launch power values. For example, a nonlinear noise tolerance improvement of about 1 dB may be achieved at the launch power value of about 6 dBm. Thus, using NLC in the FFCR scheme may further improve system performance, reduce system cost, or both.

Figure 12:
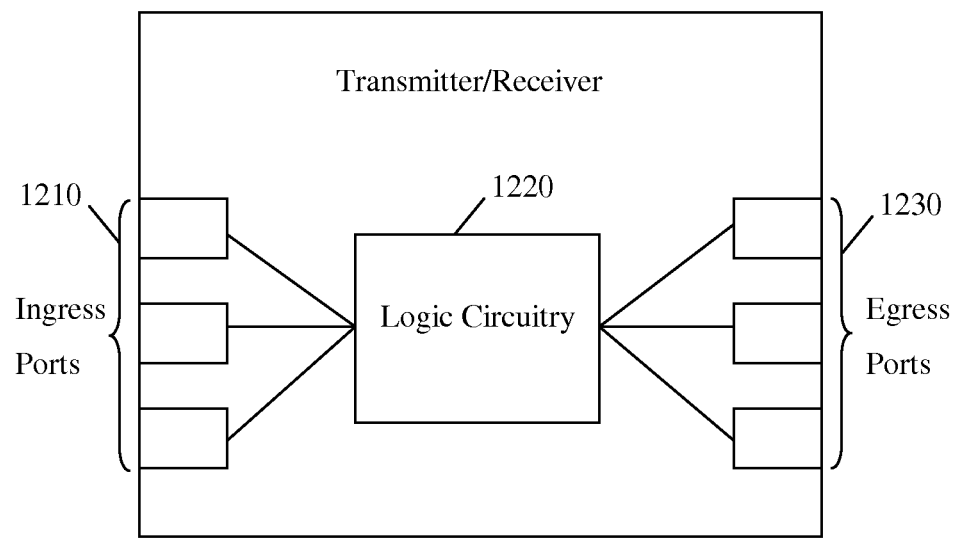
FIG. 12 is a schematic diagram of an embodiment of a transmitter/receiver unit.

FIG. 12 illustrates an embodiment of a transmitter/receiver unit 1200, which may be any device that transports packets through a network. For instance, the transmitter/receiver unit 1200 may be located in the PM coherent optical communications system 300. The transmitter/receiver unit 1200 may also be configured to implement or support the NL-LUT based phase correction method 900 described above. The transmitted/receiver unit 1200 may comprise one or more ingress ports or units 1210 for receiving packets, objects, or type-length-values (TLVs) from other network components, logic circuitry 1220 to determine which network components to send the packets to, and one or more egress ports or units 1230 for transmitting frames to the other network components. The logic circuitry 1220 may also comprise any of the carrier phase recovery correction circuits above and may be configured to implement at least some of the steps of the NL-LUT based phase correction method 900.

Figure 13:
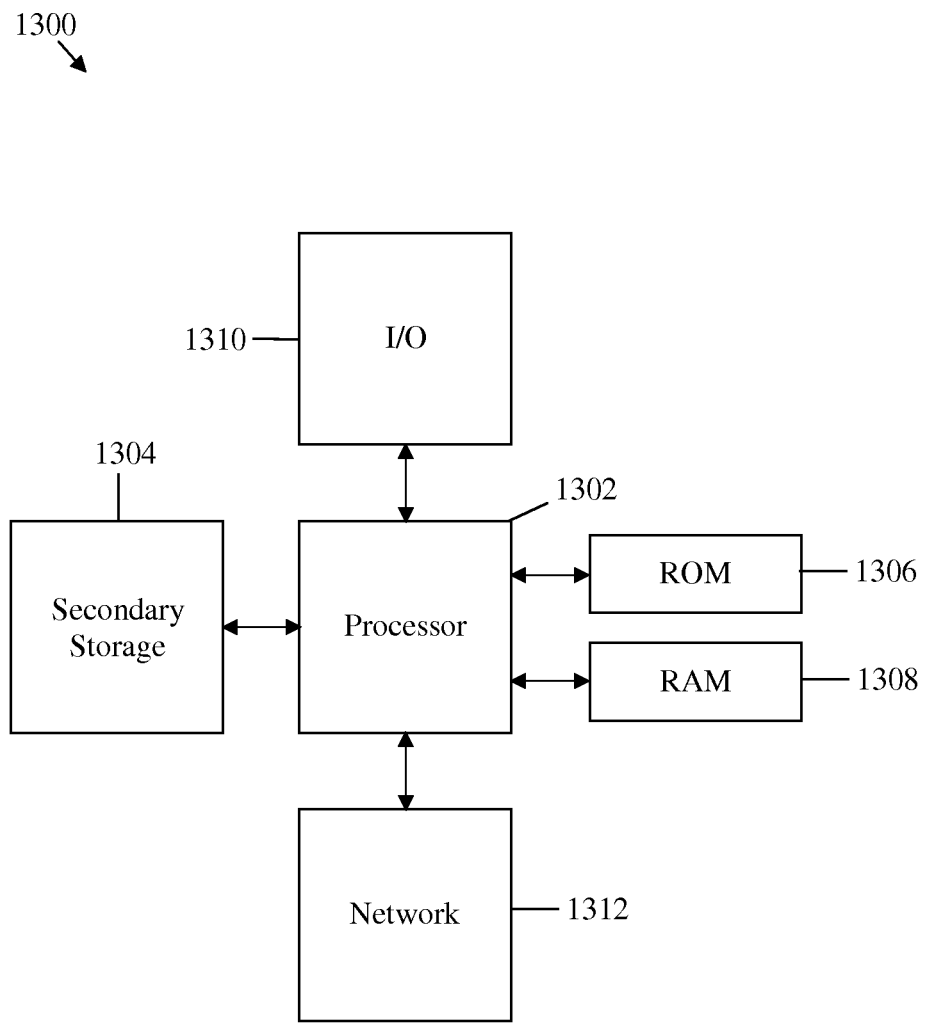
FIG. 13 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 13 illustrates a typical, general-purpose network component 1300 suitable for implementing one or more embodiments of the components disclosed herein. The network component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The processor 1302 may be implemented as one or more CPU chips, or may be part of one or more application specific integrated circuits (ASICs).

The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a nonlinear lookup unit (NL-LUU) configured to add a phase shift to the signal sample to compensate for pattern dependent phase distortion; and
    one or more first phase adjustment units coupled to the NL-LUU and configured to remove from the signal sample a nonlinear phase error from the NL-LUU,
    wherein the signal sample corresponds to a received signal polarization component of a polarization multiplexed (PM) coherent signal in a PM coherent optical system.

2. The apparatus of claim 1 further comprising:
    a second phase adjustment unit configured to receive the signal sample;
    a delay unit coupled to the second phase adjustment unit and the first phase adjustment units; and
    a bit detector coupled to the first phase adjustment units and the NL-LUU.

3. The apparatus of claim 2 further comprising:
    a second bit detector coupled to the second phase adjustment unit and the NL-LUU; and
    a phase error detecting unit coupled to the second bit detector and a filter,
    wherein the second bit detector, the phase error detecting unit, the filter, and the NL-LUU correspond to a phase detector (PD) that implements a feed forward phase correction (FFCR) for the signal sample.

4. The apparatus of claim 3, wherein the NL-LUU is a non-linear lookup table and wherein the NL-LUU comprises:
    a lookup table (LUT) address calculation unit coupled to the bit detector and the second bit detector;
    a phase error accumulator coupled to the LUT address calculation unit, at least one of the bit detector and the second bit detector, and one of the first phase adjustment units; and
    an averaging sample vector unit coupled to the phase error compensator.

5. The apparatus of claim 3 further comprising:
    a phase error integrator coupled to the second phase adjustment unit and to the filter via a signal mixer; and
    a second delay unit coupled to the phase error detecting unit and the phase error integrator;
    wherein the phase error integrator unit, the second delay unit, and the signal mixer correspond to a linear phase ramp estimator that implements a feed backward phase ramp correction (FBPC) for the signal sample.

6. The apparatus of claim 3, further comprising:
a lookup table (LUT) configured to receive the signal sample;
a fifth phase adjustment unit coupled to the LUT and the second phase adjustment unit; and
a common phase estimator coupled to the fifth phase adjustment unit,
wherein the LUT, the fifth phase adjustment unit, the common phase estimator, the second phase adjustment unit, the linear phase ramp estimator, the delay unit, the PD, the first phase adjustment units, and the bit detector correspond to a carrier phase recovery block for the received signal polarization component.

7. The apparatus of claim 6, wherein the LUT is coupled to and receives the signal sample from a multiple-input and multiple-output (MIMO) and finite impulse response (FIR) block, wherein the bit detector is coupled to and forwards the signal sample to a decision circuit, and wherein the MIMO and FIR block and the decision circuit are coupled to a second carrier phase recovery block for a second received signal polarization component that is orthogonal to the received signal polarization component.

8. The apparatus of claim 1, wherein the PM coherent signal is modulated using Phase Shift Keying (PSK) or Quadrature PSK (QPSK).

9. The apparatus of claim 1, further comprising:
a filter configured to remove noise from the signal sample;
wherein the one or more first phase adjustment units are further configured to remove from the signal sample a recovered linear phase error from the filter.

10. A network component comprising:
a receiver configured to receive a plurality of samples of signal polarization component of a polarization multiplexed (PM) coherent signal that is transported over an optical channel, remove noise in the samples using a linear filter, and remove nonlinear phase noise in the samples using a nonlinear lookup component (NL-LUC) based feed forward phase correction (FFCR) and a decision circuit.

11. The network component of claim 10, wherein additional phase error is removed from the samples using a feed backward phase ramp correction (FBPC) loop that adjusts phase in the samples after removing phase noise in the sample.

12. The network component of claim 10, wherein the carrier phase correction is achieved using the NL-LUC based FFCR and the FBPC based on carrier phase information that is obtained from an input and an output of the decision circuit.

13. The network component of claim 10, wherein the decision circuit comprises a delay unit, a phase adjustment unit, and a bit detector, and wherein the input of the decision circuit corresponds to the input of the phase adjustment unit and the output of the decision circuit corresponds to the output of the bit detector.

14. The network component of claim 10, wherein the nonlinear phase noise is removed from the samples by calculating a lookup table (LUT) address for each of the samples and adding a corresponding phase shift to each of the samples to compensate for pattern dependent phase distortion.

15. The network component of claim 14, wherein calculating the LUT address comprises calculating an index $N_i$ for each pair of adjacent symbols $S_i$ in the sample as $$N_i = \text{round}((|\Delta S_{xi}|^2 + |\Delta S_{yi}|^2)/4),$$

where $\Delta S_{xi} = S_{xi} - S_{xi-1}$ & $S_{xi} = \pm 1 \pm i$, and calculating the LUT address as $$N_{LUT} = \sum_{i=0}^{L-1} N_i \cdot 5^i,$$

where L is selected depending on symbols interfering length.

16. The network component of claim 10, wherein each of the samples are averaged by a count of the received sample to improve the accuracy of adjusted samples.

17. The network component of claim 10, wherein the NL-LUC is a non-linear lookup table.

18. A network apparatus implemented method comprising:
receiving a sample of a signal polarization component in a transmitted polarization multiplexed (PM) coherent signal; and
implementing a feed forward phase correction (FFCR) using a linear filter and a nonlinear lookup component (NL-LUC) based on a decision circuit to remove noise and carrier phase noise in the sample.

19. The network apparatus implemented method of claim 18 further comprising implementing feed backward phase ramp correction (FBPC) using a phase adjustment unit based on the decision circuit to compensate for a phase ramp in the sample due to a frequency offset.

20. The network apparatus implemented method of claim 19, wherein the noise, the carrier phase noise, and the frequency offset are caused by an optical channel that transports the PM coherent signal.

21. The network apparatus implemented method of claim 18, wherein the linear filter is a flat average window with finite impulse response (FIR) tap coefficients 0 and 1, and wherein the linear filter's bandwidth is adjusted by tuning by the number of the tap coefficients 0 and 1.

22. The network apparatus implemented method of claim 18, wherein using the NL-LUC is used in the FFCR for nonlinear correction (NLC) of carrier phase due to nonlinear phase noise, and wherein the NLC improves nonlinear noise tolerance for larger laser line-widths and higher laser launch powers.

23. The network apparatus implemented method of claim 18, wherein the NL-LUC is a non-linear lookup table.

24. A system for carrier phase estimation and correction in a coherent optical environment comprising:
a transmitter comprising a frame and header coding unit and a signal combination block coupled to the frame and header coding unit, wherein the frame and header coding unit is configured to encode and/or encapsulate input data into a plurality of parallel data streams, corresponding to a plurality of branches of a polarization multiplexed (PM) Quadrature amplitude modulation (QAM) signal, and wherein an output of the frame and header coding unit may be converted into an optical signal in the multiplexer in which the plurality of parallel data streams are combined with an electrical/optical (E/O) converter and transferred into a PM coherent signal; and
a receiver comprising configured to receive the PM coherent signal from the transmitter, wherein the receiver comprises a filter configured to remove noise from a signal sample; a nonlinear lookup unit (NL-LUU) configured to add a phase shift to the signal sample to compensate for pattern dependent phase distortion; and one or more first phase adjustment units coupled to the filter and the NL-LUU and configured to remove from the signal sample a recovered linear carrier phase error from the filter and a nonlinear phase error from the NL-LUU, wherein the signal sample corresponds to a received signal polarization component of the PM coherent signal in a PM coherent optical system.

25. The system of claim 24 wherein the receiver further comprises:
- a second phase adjustment unit configured to receive the signal sample;
- a delay unit coupled to the second phase adjustment unit and the first phase adjustment units; and
- a bit detector coupled to the first phase adjustment units and the NL-LUU.

26. The system of claim 24 wherein the receiver further comprises:
- a second bit detector coupled to the second phase adjustment unit and the NL-LUU; and
- a phase error detecting unit coupled to the second bit detector and the filter,
- wherein the second bit detector, the phase error detecting unit, the filter, and the NL-LUU correspond to a phase detector (PD) that implements a feed forward phase correction (FFCR) for the signal sample.

27. The apparatus of claim 26, wherein the NL-LUU is a non-linear lookup table and wherein the NL-LUU comprises:
- a lookup table (LUT) address calculation unit coupled to the bit detector and the second bit detector;
- a phase error accumulator coupled to the LUT address calculation unit, at least one of the bit detector and the second bit detector, and one of the first phase adjustment units; and
- an averaging sample vector unit coupled to the phase error compensator.

28. The apparatus of claim 26 wherein the receiver further comprises:
- a phase error integrator coupled to the second phase adjustment unit and to the filter via a signal mixer; and
- a second delay unit coupled to the phase error detecting unit and the phase error integrator;
- wherein the phase error integrator unit, the second delay unit, and the signal mixer correspond to a linear phase ramp estimator that implements a feed backward phase ramp correction (FBPC) for the signal sample.

29. The apparatus of claim 26, wherein the receiver further comprises:
- a lookup table (LUT) configured to receive the signal sample;
- a fifth phase adjustment unit coupled to the LUT and the second phase adjustment unit; and
- a common phase estimator coupled to the fifth phase adjustment unit,
- wherein the LUT, the fifth phase adjustment unit, the common phase estimator, the second phase adjustment unit, the linear phase ramp estimator, the delay unit, the PD, the first phase adjustment units, and the bit detector correspond to a carrier phase recovery block for the received signal polarization component.

30. The apparatus of claim 29, wherein the LUT is coupled to and receives the signal sample from a multiple-input and multiple-output (MIMO) and finite impulse response (FIR) block, wherein the bit detector is coupled to and forwards the signal sample to a decision circuit, and wherein the MIMO and FIR block and the decision circuit are coupled to a second carrier phase recovery block for a second received signal polarization component that is orthogonal to the received signal polarization component.

31. The apparatus of claim 24, wherein the PM coherent signal is modulated using Phase Shift Keying (PSK) or Quadrature PSK (QPSK).

* * * * *